(12) United States Patent  (10) Patent No.: US 8,203,832 B2
Szabolcsi  (45) Date of Patent: Jun. 19, 2012

(54) DUAL-SCREEN PORTABLE COMPUTER

(76) Inventor: Les Szabolcsi, Atlanta, GA (US)

( * ) Notice: Subject to any disclaimer, the term of this patent is extended or adjusted under 35 U.S.C. 154(b) by 211 days.

(21) Appl. No.: 12/665,813

(22) PCT Filed: Jul. 2, 2008

(86) PCT No.: PCT/US2008/069050
§ 371 (c)(1),
(2), (4) Date: Dec. 29, 2009

(87) PCT Pub. No.: WO2009/006535
PCT Pub. Date: Jan. 8, 2009

(65) Prior Publication Data
US 2010/0142139 A1    Jun. 10, 2010

Related U.S. Application Data

(60) Provisional application No. 60/947,755, filed on Jul. 3, 2007.

(51) Int. Cl.
*G06F 1/16* (2006.01)
(52) U.S. Cl. ......... 361/679.06; 361/679.04; 361/679.07; 361/679.27; 312/223.1; 312/223.2; 248/917; 248/918
(58) Field of Classification Search .............. 361/679.06
See application file for complete search history.

(56) References Cited

U.S. PATENT DOCUMENTS

| | | | |
|---|---|---|---|
| 5,995,085 A * | 11/1999 | Bowen | 345/173 |
| 6,256,192 B1 * | 7/2001 | Shannon | 361/679.06 |
| 6,266,241 B1 * | 7/2001 | Van Brocklin et al. | 361/679.46 |
| 6,700,773 B1 * | 3/2004 | Adriaansen et al. | 361/679.08 |
| 6,873,521 B2 * | 3/2005 | Landry et al. | 361/679.06 |
| 7,061,472 B1 * | 6/2006 | Schweizer et al. | 345/168 |
| 7,136,282 B1 * | 11/2006 | Rebeske | 361/679.55 |
| 7,245,270 B1 * | 7/2007 | Boos | 345/1.1 |
| 7,466,306 B2 * | 12/2008 | Connor et al. | 345/169 |
| 7,545,627 B1 * | 6/2009 | Lantigua | 361/679.04 |
| 7,864,524 B2 * | 1/2011 | Ladouceur et al. | 361/679.55 |
| 2002/0141146 A1 * | 10/2002 | Mustoe | 361/683 |
| 2003/0034951 A1 | 2/2003 | Fry et al. | |
| 2003/0142469 A1 * | 7/2003 | Ponx | 361/683 |
| 2003/0218860 A1 * | 11/2003 | Shiraiwa | 361/681 |
| 2004/0051679 A1 * | 3/2004 | Ponx | 345/1.1 |
| 2004/0125549 A1 * | 7/2004 | Iredale | 361/681 |
| 2004/0156537 A1 | 8/2004 | Chung et al. | |
| 2004/0160736 A1 * | 8/2004 | Lin | 361/683 |
| 2005/0134524 A1 * | 6/2005 | Parker et al. | 345/1.1 |
| 2006/0126284 A1 * | 6/2006 | Moscovitch | 361/681 |
| 2007/0115202 A1 | 5/2007 | Kiesenhofer | |

OTHER PUBLICATIONS

PCT International Search Report for PCT/US2008/069050 completed by the US Searching Authority on Sep. 30, 2008.

* cited by examiner

*Primary Examiner* — Anthony Q Edwards
(74) *Attorney, Agent, or Firm* — Barnes & Thornburg LLP

(57) ABSTRACT

A dual-screen portable computer may include a housing, a central processing unit coupled to the housing, a first video monitor electrically connected to the central processing unit and configured to display a computerized image from a first direction, and a panel. The panel may include a second video monitor electrically connected to the central processing unit and configured to display an identical computerized image from a second direction substantially opposite to the first direction, and an electronic signature capture pad electrically connected to the central processing unit.

16 Claims, 3 Drawing Sheets

DUAL-SCREEN PORTABLE COMPUTER

CROSS-REFERENCE TO RELATED APPLICATIONS

This application is a U.S. national counterpart application of international application serial No. PCT/US2008/069050 filed Jul. 2, 2008, which claims priority to U.S. Provisional Patent Application No. 60/947,755 filed Jul. 3, 2007, the disclosures of which are incorporated herein by reference.

BACKGROUND

The present disclosure relates to computers and particularly to portable computers. More particularly, the present disclosure is related to a dual-screen portable computer.

SUMMARY

The present invention may comprise one or more of the features recited in the attached claims, and/or one or more of the following features and combinations thereof. A dual-screen portable computer may comprise a housing, a central processing unit coupled to the housing, a first video monitor electrically connected to the central processing unit and configured to display a computerized image from a first direction, and a panel. The panel may include a second video monitor electrically connected to the central processing unit and configured to display an identical computerized image from a second direction substantially opposite to the first direction, and an electronic signature capture pad electrically connected to the central processing unit.

The first video monitor may be coupled to the housing to establish a first pivot axis, the panel may be coupled to the first video monitor to establish a second pivot axis, and the first pivot axis and the second pivot axis may be parallel to one another. Alternatively, the first pivot axis and the second pivot axis may be perpendicular to one another.

The dual-screen portable computer may further comprise a peripheral input device. The peripheral input device may be a keyboard formed on the housing and electrically connected to the central processing unit. Alternatively or additionally, the peripheral input device may be a pointing device formed on the housing and electrically connected to the central processing unit.

A dual-screen portable computer may comprise a housing defining a keyboard, a central processing unit coupled to the housing, a first video monitor having one end pivotally coupled to the housing and an opposite end, and a first panel. The first video monitor may be electrically connected to the central processing unit. The first panel may have one end pivotally coupled to the opposite end of the first video monitor and an opposite end. The first panel may include a second video monitor electrically connected to the central processing unit and an electronic signature capture pad positioned between the second video monitor and the opposite end of the first panel. The electronic signature capture pad may be electrically connected to the central processing unit.

The first pivot axis and the second pivot axis may be parallel to one another. Alternatively, the first pivot axis and the second pivot axis may be perpendicular to one another.

The electronic signature capture pad may comprise a second panel that is pivotally coupled to the first panel at or adjacent to the free end thereof. The first panel may define a cavity positioned between the second video monitor and the free end of the first panel. The cavity may be sized to receive the second panel therein. The second panel may be movable between a stored position within the cavity and a use position away from the cavity. The electronic signature capture pad may comprise a stylus that is electrically connected to the central processing unit.

The first video monitor may be configured to display a computerized image from a first direction and the second video monitor may be configured to display an identical computer image from a second direction opposite to the first direction.

A dual-screen portable computer may comprise a housing defining a keyboard, a central processing unit coupled to the housing, a first video monitor having one end pivotally coupled to the housing and an opposite end, and a second video monitor. The first video monitor may be electrically connected to the central processing unit. The first video monitor may define a viewing surface and an opposite outer surface defining a cavity therein. The second video monitor may be pivotally coupled to the outer surface of the first video monitor. The second video may be movable between a stored position within the cavity and a use position away from the cavity. The second video monitor may be electrically connected to the central processing unit.

The dual-screen portable computer may further comprise a peripheral input device. The peripheral input device may be an electronic signature capture pad that is electrically connected to the central processing unit. Alternatively or additionally, the peripheral input device may be a keyboard that is electrically connected to the central processing unit. Alternatively or additionally, the peripheral input device may be a pointing device that is electrically connected to the central processing unit.

The second video monitor may be pivotally coupled to the outer surface of the first video monitor adjacent to an upper edge of the second video monitor such that the upper edge of the second video monitor extends along an upper edge of the cavity and a lower edge of the second video monitor is movable toward and away from the cavity.

The dual-screen portable computer may further comprise a removable protective cover configured to cover the second video monitor when coupled thereto.

BRIEF DESCRIPTION OF THE DRAWINGS

The detailed description particularly refers to the accompany figures in which:

FIG. 1 is a perspective view of an dual-screen portable computer in accordance with a first embodiment of the present disclosure showing the dual-screen portable computer in the folded storage position, the portable computer including a video display unit (VDU) having first and second monitors and a central processing unit (CPU) mounted within a housing;

FIG. 2 is a perspective view of the dual-screen portable computer of FIG. 1 showing an intermediate position where the VDU is rotating about a first pivot axis to expose a keyboard coupled to the housing;

FIG. 3 is a perspective view of the dual-screen portable computer of FIG. 1 showing the computer in the expanded use position where a computerized image on the first monitor is visible to an operator of the CPU and the second monitor has been rotated about a second pivot axis to position the screen so that a viewer positioned opposite the operator is able to view an identical computerized image on the second monitor;

DETAILED DESCRIPTION

Figure 1:
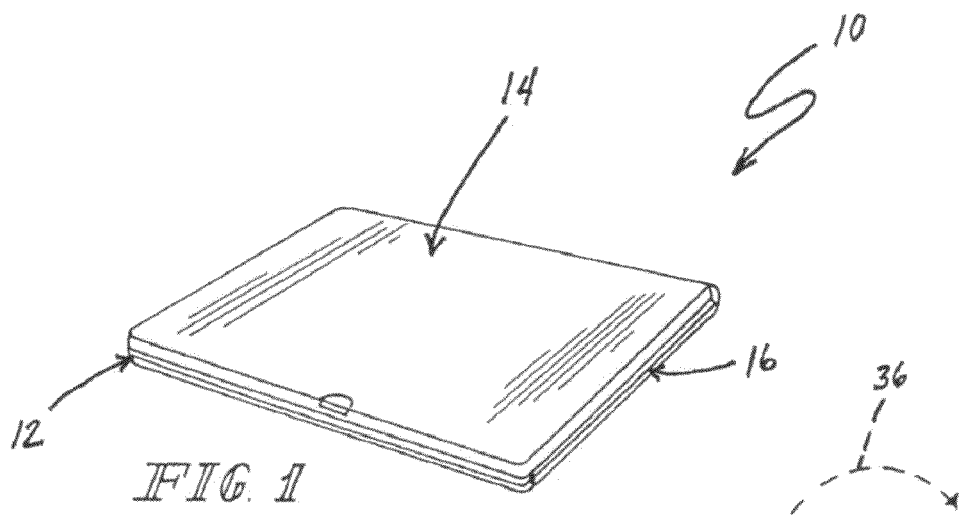
FIGS. 1-3 show movement of an dual-screen portable computer from a folded storage position to an expanded use position.
Figure 2:
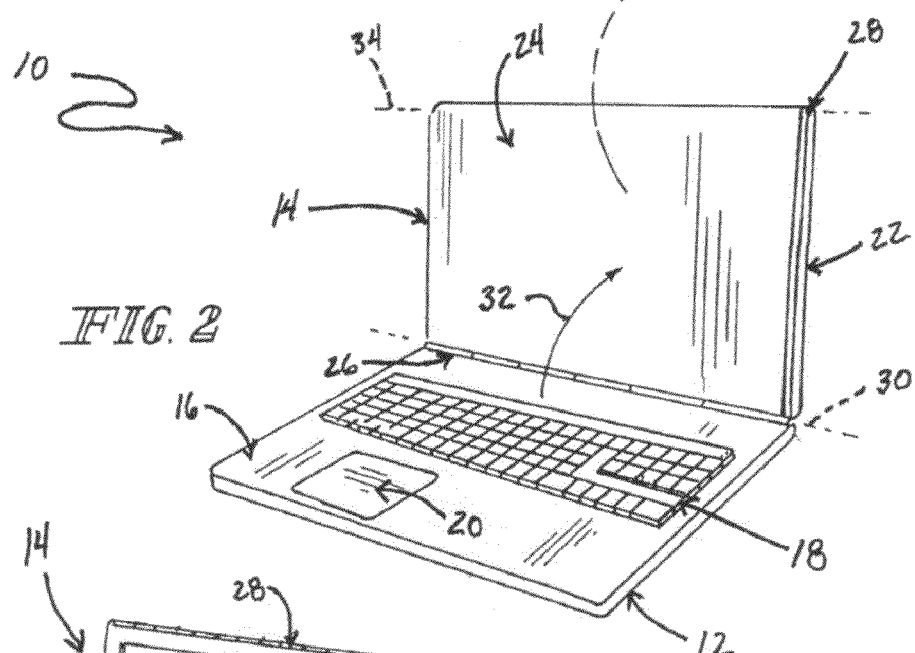
Figure 3:
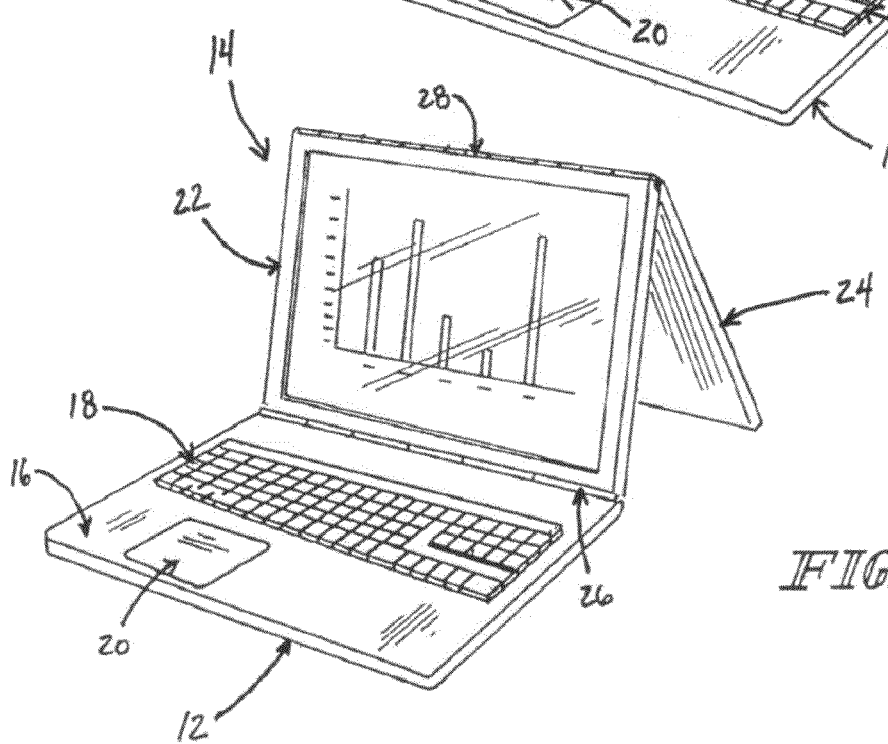

A dual-screen portable computer 10 includes a central processing unit (CPU) 12 and a video display unit (VDU) 14 as shown in FIGS. 1-3. CPU 12 includes a housing 16, a keyboard 18 mounted to an upper surface of the housing 16, and a "mouse" touch pad 20 formed on housing 16. CPU 12 may include any suitable computer processing system adapted to be mounted within the housing 16 to operate the portable computer 10 in a conventional manner. A "portable computer" herein is intended to define a transportable assembly that comprises a plurality of components, e.g., CPU, monitors, etc., that can be folded or collapsed from a use condition to a carrying condition such as, for example, a "laptop," "notebook," or other mobile computer.

The VDU 14 includes an first monitor 22, a second monitor 24, a first hinge 26, and a second hinge 28 as shown in FIGS. 2 and 3. First hinge 26 is located between an edge of the housing 16 and a lower edge of the first monitor 22 and defines a first pivot axis 30. The first monitor 22 is configured to rotate about the first pivot axis 30 in a direction 32 to move the VDU 14 relative to the housing 16 between a folded storage position shown in FIG. 1 and an expanded use position shown in FIG. 3.

Figure 4:
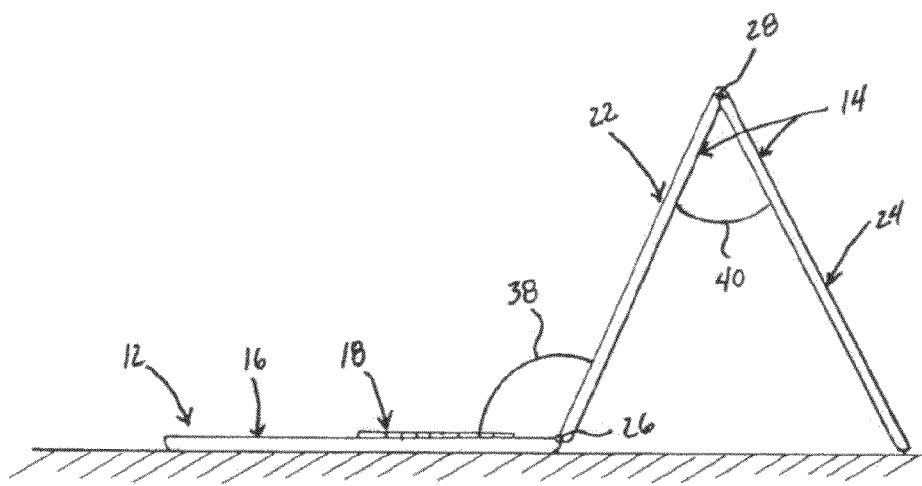
FIG. 4 is a side elevation view of the dual-screen portable computer of FIG. 3 showing the computer in the expanded use position where the first monitor and second monitor cooperate to form an "easel-style" monitor arrangement.

The second hinge 28 is located between an upper edge of the first monitor 22 and an upper edge of the second monitor 24 as most clearly illustrated in FIGS. 3 and 4. The second hinge 28 defines a second pivot axis 34. The second monitor 24 is configured to rotate about the second pivot axis 34 in a direction 36 and cooperates with the first monitor 22 to establish an "easel-type" monitor arrangement. In illustrative embodiments, the first pivot axis 30 and the second pivot axis 34 are positioned in a parallel relationship to one another. However, in other embodiments contemplated by this disclosure, the second hinge 28 and the second pivot axis 34 may be positioned in a perpendicular relationship to the first hinge 26 and first pivot axis 30, respectively. In still other embodiments, either or both of the first monitor 22 and second monitor 24 may be "stand alone" units that are hard-wire or wirelessly connected to the CPU 12.

In use, a computer operator first rotates the VDU 14 about the first pivot axis 30 in direction 32 to an intermediate position to establish an approximately 115° included angle 38 between an upper surface of the housing 16 and the VDU 14 as illustrated in FIG. 2. The operator then rotates the second monitor 24 approximately 300° in direction 36 to establish an included angle 40 of about 60° between the first monitor 22 and the second monitor 24 to establish the expanded use position of FIGS. 3 and 4. It will be understood that the numerical angles just described are provided only by way of example, and that this disclosure contemplates alternative angles between the upper surface of the housing 16 and the VDU 14, in the direction 36 and/or between the first monitor 22 and the second monitor 24.

In the expanded use position of FIGS. 3 and 4, the dual-screen portable computer 10 allows the computer operator to view a computerized image displayed on the first monitor 22 from a first direction while a viewer is able to view an identical computerized image displayed on the second monitor 24 from a second direction substantially opposite to the first direction. This monitor arrangement may be useful, for example, for sales persons or the like who show visual presentations to others in the course of their business. It may also be useful in other settings such as, for example, student-teacher presentations, or tutoring.

Figure 5:
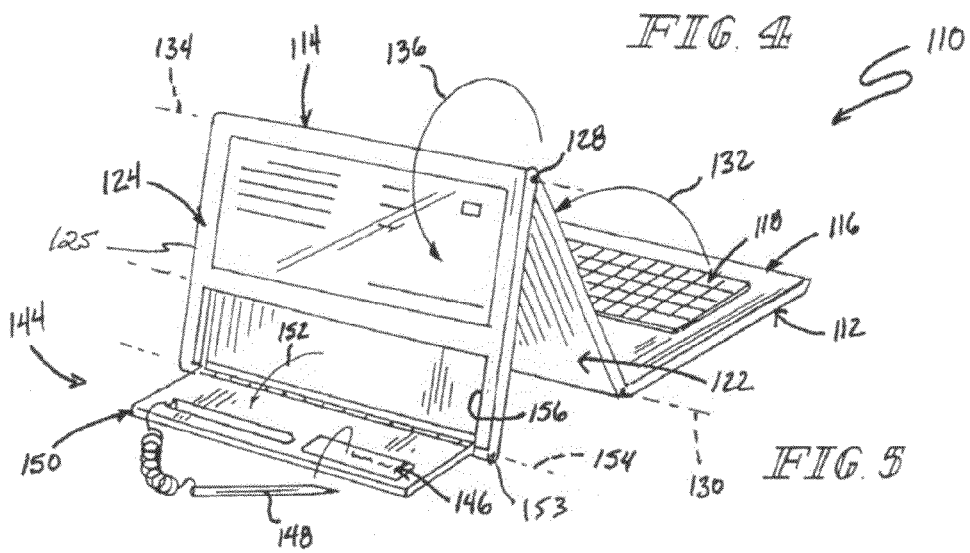
FIG. 5 is a perspective view of an dual-screen portable computer in accordance with a second embodiment of the present disclosure showing the dual-screen portable computer including an electronic signature pad and stylus associated with the second monitor.

In a second illustrative embodiment shown in FIG. 5, a dual-screen portable computer 110 includes a CPU 112 and a VDU 114 as shown in FIG. 5. CPU 112 includes a housing 116, a keyboard 118 mounted to or form in an upper surface of the housing 116. CPU 112 may include any suitable computer processing system adapted to be mounted within the housing 116 to operate the portable computer 110 in a conventional manner.

The dual-screen portable computer 110 includes a first monitor 122, a panel 125, a first hinge 126, and a second hinge 128 as shown in FIG. 5. First hinge 126 is located between an edge of the housing 116 and a lower edge of the first monitor 122. The first hinge 126 defines a first pivot axis 130 such that the first monitor 122 is pivotally coupled to the housing 116 along its lower edge. The first monitor 122 is configured to rotate about the first pivot axis 130 in a direction 132 to move the VDU 114 relative to housing 116 between a folded storage position (similar to FIG. 1) and an expanded use position shown in FIG. 5. The second hinge 128 is located between an upper edge of the first monitor 122 and one edge of the panel 125. The free end of the panel 125 may rest against the support surface upon which the housing 116 rests. The second hinge 128 defines a second pivot axis 134 such that the panel 125 is pivotally coupled to the housing 116 along one edge.

The panel 125 illustratively includes a second monitor 124 and a signature device 144 positioned between the second monitor 124 and the free end of the panel 125. The signature device 144 includes an electronic signature capture pad 146 that is in electronic communication with the CPU 112, and a stylus 148 that is electrically connected to the CPU 112 via a wired interface, or that is alternatively configured to communicate wirelessly with the CPU 112. In any case, the stylus 148 may be manually manipulated by a user in a conventional manner to write information on the signature pad 146, and the CPU 112 is operable to capture the information written on the signature pad 146 in a conventional manner. The signature pad 146 is illustratively provided in the form of a panel 150 that is movably coupled to the second monitor 124 such that the panel 150 is movable relative to the second monitor 124. In the illustrated embodiment, a hinge 153 is located between the panel 125 and a lower edge of the panel 150 at or near the free end of the panel 125. The hinge 153 defines a pivot axis 154 such that the panel 150 is pivotally coupled to the panel 125 along or adjacent to the lower edges of each panel 125, 150. The signature device 144 may be supplemented by other conventional peripheral devices (not shown) such as, for example, a keyboard, a pointing device, and the like.

Panel 150 is configured to nest within a cavity 156 formed beneath the second monitor 124 and can be rotated from a stored position within the cavity 156 to a use position away from the cavity 156, e.g., adjacent to or supported by a surface that supports the CPU 112 as illustrated in FIG. 5. The signature device 144 allows a presentation viewer the ability to provide an electronic signature when required, for example, when signing contracts, agreements, or any other document requiring a written signature. The CPU 112 is then operable to incorporate the electronic signature in one or more documents stored in the CPU 112. In some embodiments, the panel 150 may be detachable from the second monitor 124 and in such embodiments the signature pad 146 is configured to communicate wirelessly with the CPU 112.

Figure 6:
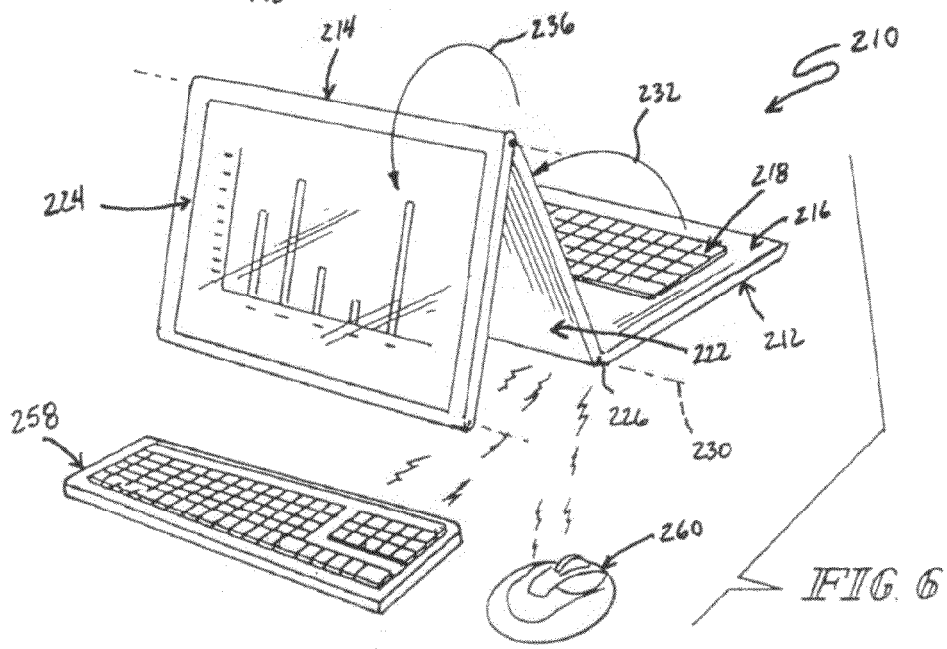
FIG. 6 is a perspective view of an dual-screen portable computer in accordance with a third embodiment of the present disclosure showing the dual-screen portable computer kit.

In a third illustrative embodiment shown in FIG. 6, a dual-screen portable computer 210 includes a CPU 212 and a VDU 214. The CPU 212 includes a housing 216, a keyboard 218 mounted to an upper surface of the housing 216. The CPU 212 may include any suitable computer processing system adapted to be mounted within the housing 216 to operate the portable computer 210 in a conventional manner.

The dual-screen portable computer 210 includes a first monitor 222, a second monitor 224, a first hinge 226, and a second hinge 228 as shown in FIG. 6. The first hinge 226 is located between an edge of the housing 216 and a lower edge of the first monitor 222. The first hinge 226 defines a first pivot axis 230. The first monitor 222 is configured to rotate about the first pivot axis 230 in a direction 232 to move the VDU 214 relative to the housing 216 between a folded storage position (similar to FIG. 1) and an expanded use position shown in FIG. 6.

The dual-screen portable computer 210 further includes a wireless keyboard 258 and a wireless mouse 260 arranged for use by the presentation viewer. In other embodiments, the wireless keyboard 258 and/or the mouse 260 may be used in conjunction with the signature device 144 illustrated in FIG. 5 and described above to provide the presentation viewer with a variety of input devices with which to interact, for example, with media presented by the user and displayed on the second monitor 224. Although depicted as having wireless connectivity, in some embodiments the keyboard 258 and/or the mouse 260 may be in electronic communication by way of conventional wiring.

Figure 7:
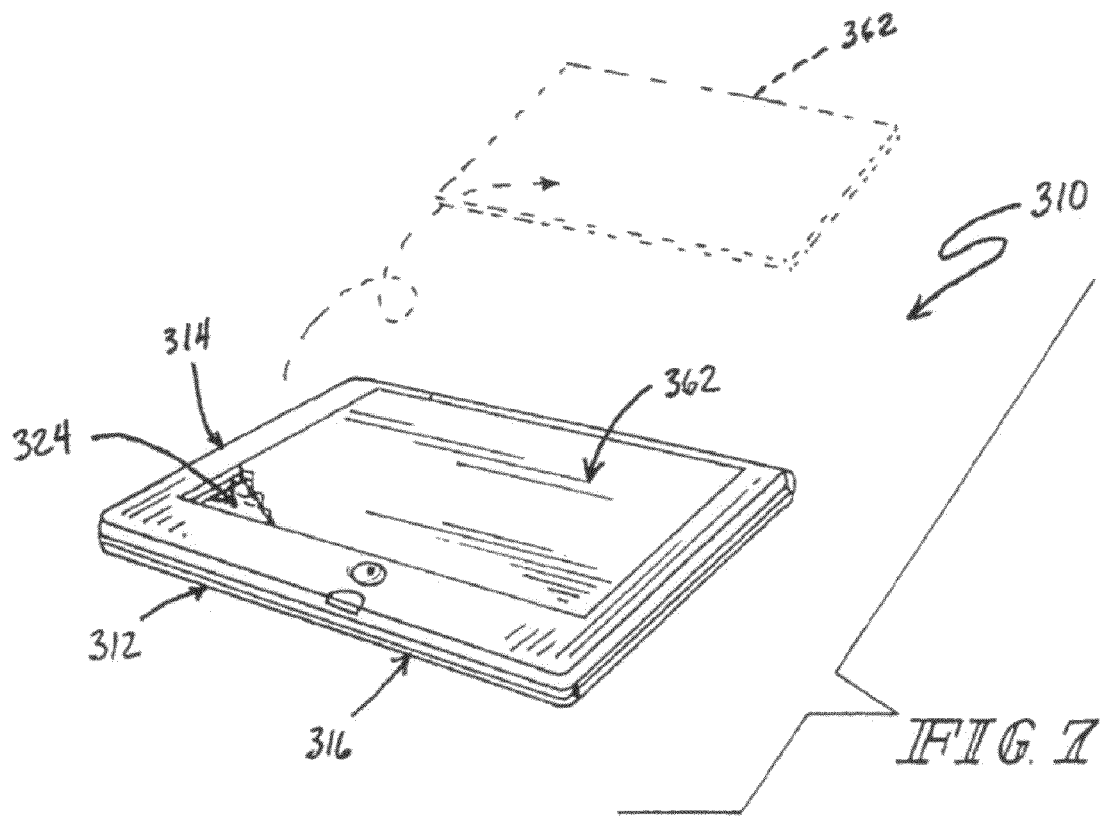
FIG. 7 is a perspective view of an dual-screen portable computer in accordance with a fourth embodiment of the present disclosure showing an inset second monitor mounted to a reverse side of a first monitor, and a removable protective cover is removed by the user to expose the second monitor.
Figure 8:
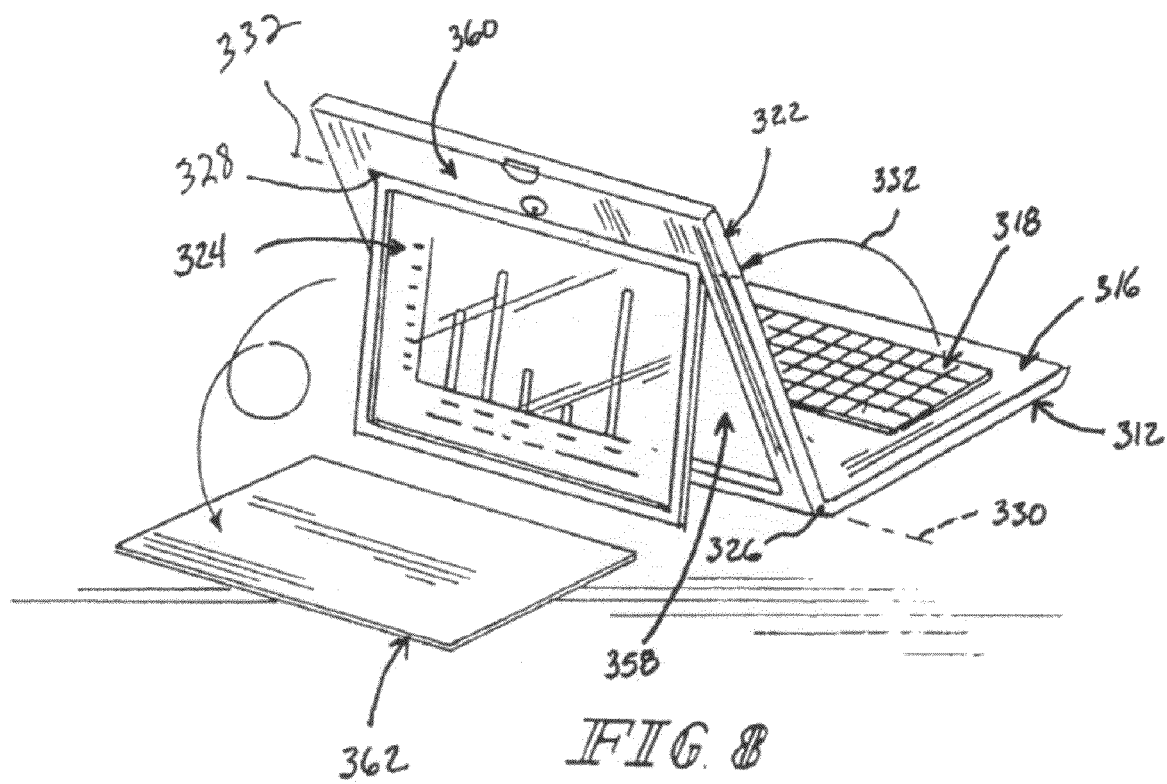
FIG. 8 is a perspective view of the dual-screen portable computer of FIG. 7 showing the first monitor opened to a use position and the second monitor rotated about a pivot axis to a suitable position for the viewer to observe the second monitor, and the presentation screen protective cover is removed and lying on an underlying surface.

In a fourth illustrative embodiment shown in FIGS. 7 and 8, a dual-screen portable computer 310 includes a CPU 312 and a VDU 314. The CPU 312 includes a housing 316, a keyboard 318 mounted to an upper surface of the housing 316. The CPU 312 may include any suitable computer processing system adapted to be mounted within the housing 316 to operate the portable computer 310 in a conventional manner.

The dual-screen portable computer 310 includes a first monitor 322, a second monitor 324, a first hinge 326, and a second hinge 328 as shown in FIG. 8. The first hinge 326 is located between an edge of the housing 316 and a lower edge of the first monitor 322. The first hinge 326 defines a first pivot axis 330. The first monitor 322 is configured to rotate about the first pivot axis 330 in a direction 332 to move the VDU 314 relative to the housing 316 between a folded storage position shown in FIG. 7 and an expanded use position shown in FIG. 8. The first monitor 322 defines a viewing surface and an outer surface 360 that is opposite to the viewing surface.

The second monitor 324 is arranged to nest within a cavity 358 formed on an outer surface 360 of the first monitor 322 as shown in FIG. 7. The second hinge 328 is illustratively located between the outer surface 360 of the first monitor 322 and the upper edge of the second monitor 324 such that the upper edge of the second monitor 324 extends along the upper edge of the cavity 358. The second hinge 328 defines a second pivot axis 332. The second monitor 324 is configured to rotate about the second pivot axis 332 between a stored position within the cavity 358 and a use position away from the cavity 358 as illustrated in FIG. 8. The hinges 326 and 328 are configured to allow the first and second video monitors 322 and 324 to be moved to positions suitable for viewing from generally opposite directions as described hereinabove.

A protective cover 362 is configured to substantially cover the second monitor 324 for protection during, for example, transport, or other such activities. The cover 362 illustratively couples to the second monitor 324 and is held in place by a friction fit. The cover 362 may be made of any suitable protective material such as, for example, plastic, vinyl, or aluminum.

In illustrative embodiments, dual-screen portable computer 310 may be equipped with a variety of wireless peripheral devices such as, for example, a keyboard, a mouse, and a signature pad for use by the presentation viewer. These peripheral input devices may also be electrically connected to the CPU 312 in a conventional manner such as, for example, wiring or optical cable.

The invention claimed is:

1. A dual-screen portable computer comprising:
   a housing,
   a central processing unit coupled to the housing,
   a first video monitor electrically connected to the central processing unit and configured to display a computerized image from a first direction, and
   a panel including a second video monitor electrically connected to the central processing unit and configured to display an identical computerized image from a second direction substantially opposite to the first direction, and
   an electronic signature capture pad movably coupled to the panel and electrically connected to the central processing unit.

2. The dual-screen portable computer of claim 1 wherein the first video monitor is coupled to the housing to establish a first pivot axis, the panel is coupled to the first video monitor to establish a second pivot axis, and the first pivot axis and the second pivot axis are parallel to one another.

3. The dual-screen portable computer of claim 1 further comprising a peripheral input device.

4. The dual-screen portable computer of claim 3 wherein the peripheral input device is a keyboard formed on the housing and electrically connected to the central processing unit.

5. The dual-screen portable computer of claim 3 wherein the peripheral input device is a pointing device formed on the housing and electrically connected to the central processing unit.

6. A dual-screen portable computer comprising:
   a housing defining a keyboard,
   a central processing unit coupled to the housing,
   a first video monitor having one end pivotally coupled to the housing and an opposite end, the first video monitor electrically connected to the central processing unit,
   a panel having one end pivotally coupled to the opposite end of the first video monitor and an opposite end, the panel including a second video monitor electrically connected to the central processing unit and an electronic signature capture pad movably coupled to the panel and positioned between the second video monitor and the opposite end of the panel, the electronic signature capture pad electrically connected to the central processing unit.

7. The dual-screen portable computer of claim 6 wherein the first video monitor is coupled to the housing to establish a first pivot axis, the panel is coupled to the first video monitor to establish a second pivot axis, and wherein the first pivot axis and the second pivot axis are parallel to one another.

8. A dual-screen portable computer comprising:
a housing defining a keyboard,
a central processing unit coupled to the housing,
a first video monitor having one end pivotally coupled to the housing and an opposite end, the first video monitor electrically connected to the central processing unit
a first panel having one end pivotally coupled to the opposite end of the first video monitor and an opposite end, the first panel including a second video monitor electrically connected to the central processing unit, and
an electronic signature capture pad electrically connected to the central processing unit and positioned between the second video monitor and the opposite end of the first panel, the electronic signature capture pad comprising a second panel that is pivotally coupled to the first panel at or adjacent to the free end thereof.

9. The dual-screen portable computer of claim 8 wherein the first panel defines a cavity positioned between the second video monitor and the free end of the first panel, the cavity sized to receive the second panel therein, the second panel movable between a stored position within the cavity and a use position away from the cavity.

10. The dual-screen portable computer of claim 8 wherein the electronic signature capture pad comprises a stylus that is electrically connected to the central processing unit.

11. The dual-screen portable computer of claim 8 wherein the first video monitor is configured to display a computerized image from a first direction and the second video monitor is configured to display an identical computer image from a second direction opposite to the first direction.

12. The dual-screen portable computer of claim 8 further comprising a peripheral input device.

13. The dual-screen portable computer of claim 12 wherein the peripheral input device is a pointing device formed on the housing and electrically connected to the central processing unit.

14. The dual-screen portable computer of claim 6 wherein the first video monitor is configured to display a computerized image from a first direction and the second video monitor is configured to display an identical computer image from a second direction opposite to the first direction.

15. The dual-screen portable computer of claim 6 further comprising a peripheral input device.

16. The dual-screen portable computer of claim 15 wherein the peripheral input device is a pointing device formed on the housing and electrically connected to the central processing unit.

\* \* \* \* \*